UNITED STATES PATENT OFFICE.

JOHN LAWRENCE KLEIN, OF NEW YORK, N. Y.

IMPROVEMENT IN THE MANUFACTURE OF PARAFFINE CANDLES.

Specification forming part of Letters Patent No. 45,161, dated November 22, 1864.

*To all whom it may concern:*

Be it known that I, JOHN LAWRENCE KLEIN, of the city and county of New York, State of New York, have invented a new and Improved Process for Making Candles from Paraffine in Combination with other Substances; and I do hereby declare that the following is a full and exact description thereof.

The nature of my invention is as follows:

To make this candle I put thirty gallons of water in a vessel, and add to it ten (10) pounds of chloride of lime, five (5) pounds of muriatic acid. I then stir the whole four or five times a day for eight (8) days. Then I leave it to settle until it gets clear. I then take one hundred (100) pounds of raw paraffine and place it in a boiler heated by dry steam to at least one hundred and sixty (160°) degrees of Fahrenheit. I add to this two (2) gallons of the above mixture. Let the whole boil five minutes. I then turn off the steam, leaving it in the boiler for thirty minutes to clear. I then place this mixture in tin pans of the capacity of five pounds each, leaving it to cool. When sufficiently cool, I then place this mixture in linen bags of the capacity to hold five pounds, tie the same securely, and place the bags under a hydraulic press of one hundred tons pressure and press these bags until all of the oil is extracted. I then take one hundred pounds of the mixture last - above described and put it into a steam-heated boiler, and to this I add one gallon of the preparation or mixture first-above described. To this I add two pounds of aqua-ammonia, two pounds of lump-alum. I then let this mixture boil in a steam-boiler for five minutes. I then turn off the steam and leave it in the boiler for thirty minutes to clear. I then place it into tin pans holding four or five pounds and leave it to become perfectly cold. I then place it in a mill and grind it until I reduce it to powder. I then put this powder in linen bags holding from four to five pounds each, which I then put under hydraulic pressure of one hundred and fifty tons pressure. It is pressed until all the liquid is extracted. I then take one hundred pounds of this last composition and place it in a steam-heated boiler, and to this I add two gallons of naphtha, and I leave it to boil for five minutes. I then turn off the steam and let it settle for thirty minutes. It is then placed in pans holding four or five pounds, and left until perfectly cold. When cold, I take it out, place it in a mill, and grind it to powder. I then put it into woolen bags of four or five pounds, and these bags I put into linen bags sufficient to hold them, closing them tight. I put them under hydraulic pressure equal to three hundred tons until all the liquid is extracted. I then take one hundred pounds of this last composition and place it in a copper kettle, and add to this fifteen pounds of stearine, five pounds of spermaceti. I then introduce wet steam into the kettle, leaving the whole to boil for four or five hours. After boiling this length of time, the composition or mixture emits no odor. The substance or composition of matter with which I make the paraffine candle is then completed. I then take one hundred pounds of the mixture or composition thus made and place it in a kettle and introduce dry steam, and raise the heat to 200° Fahrenheit. I then heat the molds, which are made of tin, and pour the composition into the molds and expose the molds to an atmosphere of 1° below zero, leaving it for half an hour, when the candles are made.

What I claim as my invention, and desire to secure by Letters Patent, is—

A new and improved process for making paraffine candles, as herein described, using for that purpose the aforesaid ingredients or compositions of matter, or any other substantially the same, and which will produce the intended effect.

JOHN LORENZ KLEIN.

Witnesses:
  A. MARKS,
  O. G. CAVARD.